United States Patent [19]

Lee

[11] Patent Number: 4,804,413

[45] Date of Patent: Feb. 14, 1989

[54] SHOE POLISH COMPOSITION

[76] Inventor: Peter P. Lee, 2267 Clementina Dr., Hacienda Heights, Calif. 91745

[21] Appl. No.: 6,709

[22] Filed: Jan. 23, 1987

Related U.S. Application Data

[63] Continuation-in-part of Ser. No. 747,910, Jun. 24, 1985, abandoned.

[51] Int. Cl.$^4$ ............................................... C09G 1/08
[52] U.S. Cl. ........................................ 106/8; 106/3; 106/10; 106/11; 106/287.1
[58] Field of Search ................. 106/10, 11, 8, 3, 287.1

[56] References Cited

U.S. PATENT DOCUMENTS 2,716,610  8/1955  Russo et al. ............................ 106/3
4,013,475  3/1977  Liebowitz et al. ..................... 106/10

Primary Examiner—Amelia Burgess Yarbrough
Attorney, Agent, or Firm—Boniard I. Brown

[57] ABSTRACT

A non-caking shoe polish composition comprising in addition to a traditional base mixture of paraffin wax and turpentine oil, refined petroleum jelly, silicone oil, and optionally, camphor oil, silicone powder, and color ink. The composition may be usefully impregnated into a shoe polish cloth consisting of a section of fabric material adapted for easy and non-messy application of the composition onto leather or imitation leather materials.

9 Claims, No Drawings

SHOE POLISH COMPOSITION

RELATED APPLICATIONS

This application is a continuation-in-part of application Ser. No. 747,910, filed June 24, 1985, now abandoned.

BACKGROUND OF THE INVENTION

This invention relates to shoe polish compositions. More particularly, this invention relates to shoe polish compositions which contain ingredients designed to render the composition non-caking and resistant to drying out by the inclusion of petroleum jelly and silicone oil.

Traditional shoe polish compositions have been around for many years. The chief ingredients in such prior art mixtures are paraffin wax along with turpentine oil and optionally color ink and beeswax. These compositions do an adequate job; however, after a few months, they typically dry out and fracture within their containers into a crumbled mass of solidified material which is then difficult to apply to leather or leather-like materials. Typically the prior art composition is about 50% paraffin wax and about 50% turpentine oil with minor amounts of the optional color ink and beeswax materials. Some prior art compositions include substantial water which evaporates in time, with resultant detrimental caking and cracking of the polish.

SUMMARY OF THE INVENTION

This improved shoe polish composition comprises in addition to a base mixture consisting of paraffin wax and turpentine oil, effective amounts of refined petroleum jelly and silicone oil. Optional ingredients also include camphor oil, silicone powder, and color ink. The shoe polish composition is very effectively carried and applied by being impregnated into a section of fabric material.

DETAILED DESCRIPTION OF THE INVENTION

This invention presents a new type of shoe polish in that it is of significantly lower viscosity than the traditional shoe polish mixtures. This lower viscosity is provided by the addition of refined petroleum jelly such as vaseline and also silicone oil. These ingredients effectively prevent the caking, which affects the traditional prior art shoe polish mixtures, for periods in excess of two years. The addition of camphor oil also acts as an anti-caking agent. The silicone powder adds further lubricity to facilitate easy application of the composition onto the leather or leather like object of interest. The color ink is not necessary for transparent shoe polishes but would be necessary to lend needed color to shoe polish compositions designed for applications that would require such color. The color ink utilized is essentially water-free to preclude drying out, caking, and fracturing. A waterless black ink may comprise a fine powder of coal, asphalt, and a petroleum oil. A waterless red ink may comprise diacite esters, propoxyethanol, butoxyethyl, butoxyethylanol, and a lead compound. A brown ink may comprise a mixture of about 10% to 15% red ink and about 85% to 90% black ink. Although the invention will be described as a shoe polish, it should be realized that in a larger sense the composition is also readily adaptable for use as a leather dressing for articles other than shoes which are fabricated from leather or imitation leather.

The table set forth immediately below lists as weight percentages the various ingredients for the improved shoe polish composition. The first column lists the various ingredients, the second column sets forth the percentages by weight of these various ingredients for one embodiment of the invention, the third column sets forth the broad range possibilities for the various ingredients and the final column sets forth the preferred narrow range of weight percentages for the various ingredients.

|  | Embodiment Number 1 | Broad Range | Narrow Range |
| --- | --- | --- | --- |
| Paraffin Wax | 6.5% | 1%–20% | 3%–15% |
| Turpentine Oil | 12.5% | 5%–60% | 10%–50% |
| Petroleum Jelly | 73.5% | 10%–90% | 20%–80% |
| Silicone Oil | 2.5% | 1%–15% | 1.5%–10% |
| Camphor Oil | 2.5% | 1%–15% | 1.5%–10% |
| Silicone Powder | 1.25% | 0.1%–5% | 0.5%–4% |
| Color Ink (option) | 1.25% | 0%–15% | 0%–10% |

Inspection of the table above quickly indicates that the predominate component will normally be the new ingredient of the refined petroleum jelly component, normally referred to as white vaseline. Since this petroleum jelly is a refined product which consists of a relatively narrow range of viscous long chain hydrocarbons, it retains its fluidity for long periods of time. This is in contrast to the prior art base materials of paraffin wax and turpentine oil which are a mixture of various types of hydrocarbon materials, some of which are volatiles which gradually escape over time. The color ink component is substantially water-free, and therefore the color ink is not detrimental to the anti-caking properties of polish according to the invention. Prior art polishes which have substantial or large amounts of water in their compositions are subject to detrimental caking over any substantial period of time with evaporation of the water. After the volatiles and water escape from prior art polishes, only the heavier hydrocarbon compounds remain which then crack and turn into relatively hard lumps. The silicone oil and the camphor oil also add to the non-caking qualities of the composition.

While the composition of this invention may be applied in a transitional manner from shoe polish tins or jars using daubers and brushes, it is perhaps more conveniently utilized by impregnating the shoe polish composition into fabric material or mitts. The fabric or mitt may be then directly rubbed onto the article of leather or leather-like material and then buffed to a shine using another section of the fabric or mitt to polish the article. When utilized in this fashion, the fabric may be conveniently constructed so as to be relatively inexpensive and therefore disposable after a relatively limited number of applications. However, due to the presence of the refined petroleum jelly as the main ingredient of the composition, the impregnated fabric or mitt may be stored for long periods of time prior to the utilization of the shoe polish composition. This is in contrast to usage of conventional shoe polish compositions which would have dried out relatively rapidly in such impregnated conditions. The volatiles would escape very rapidly since the traditional composition would not be enclosed in an air tight container as it would be normally.

When utilized in this manner, being impregnated into a fabric article, the polish composition has a shelf life in excess of two years without suffering from caking or drying out. The composition is capable of bringing a high shine to the article of leather or leather-like material and the ingredients also serve to preserve the leather.

The inventor claims:

1. An improved non-caking shoe polish composition consisting essentially of in addition to a base mixture consisting of paraffin wax and turpentine oil in an amount less than about 80% by weight of the total composition:
   refined petroleum jelly in an amount from about 10% to about 90 weight percent, and
   silicone oil in an amount from about 1.0 to about 15 weight percent.

2. The composition of claim 1 additionally consisting essentially of camphor oil in an amount ranging from about 1 to about 15 weight percent.

3. The composition of claim 1 additionally consisting essentially of silicone powder in an amount ranging from about 0.1 to about 5 weight percent.

4. An improved non-caking shoe polish composition consisting essentially of an addition to a base mixture consisting of paraffin wax and turpentine oil in an amount less than about 65% by weight of the total composition:
   refined petroleum jelly in an amount from about 20 to about 80 weight percent, and
   silicone oil in an amount from about 1.5 to about 10 weight percent.

5. The composition of claim 4 additionally consisting essentially of camphor oil in an amount from about 1.5 to about 10 weight percent.

6. The composition of claim 4 additionally consisting essentially of silicone powder in an amount from about 0.5 to about 4 weight percent.

7. An improved non-caking shoe polish composition consisting essentially of in addition to a base mixture consisting of paraffin wax and turpentine oil in an amount less than about 29 weight percent of the total composition:
   petroleum jelly in an amount of about 73.5%, and
   silicone in an amount of about 2.5 weight percent.

8. The composition of claim 7 additionally consisting essentially of camphor oil in an amount of about 2.5 weight percent.

9. The composition of claim 7 additionally consisting essentially of silicone powder in an amount of about 1.25% by weight.

* * * * *